United States Patent [19]

Kuwahara et al.

[11] Patent Number: 5,580,633
[45] Date of Patent: Dec. 3, 1996

[54] MAGNETO-OPTICAL DISC HAVING A PROTECTIVE LAYER OF CURED RADIATION CURABLE RESIN CONTAINING CARBON PARTICLES

[75] Inventors: Tsuneo Kuwahara; Hiroyuki Endo; Isamu Kuribayashi; Hideki Hirata, all of Nagano, Japan

[73] Assignee: TDK Corporation, Tokyo, Japan

[21] Appl. No.: 277,363

[22] Filed: Jul. 19, 1994

Related U.S. Application Data

[63] Continuation of Ser. No. 45,106, Apr. 12, 1993, abandoned.

[30] Foreign Application Priority Data

Apr. 24, 1992 [JP] Japan ........................... 4-131648

[51] Int. Cl.⁶ .................................................. G11B 5/72
[52] U.S. Cl. .................. 428/64.3; 428/65.5; 428/323; 428/332; 428/336; 428/408; 428/694 BP; 428/694 TP; 428/694 BC; 428/694 DE; 428/694 SG; 428/900; 369/13
[58] Field of Search .................. 428/694 SG, 694 BP, 428/694 TP, 694 B, 694 AH, 408, 323, 900, 64.3, 65.5, 332, 336, 694 BC, 694 DE; 369/13

[56] References Cited

U.S. PATENT DOCUMENTS

4,427,738  1/1984  Fujiyama et al. ................. 428/323
4,812,358  3/1989  Miyake et al. .................... 428/408
5,089,317  2/1992  Noguchi et al. .................. 428/212

FOREIGN PATENT DOCUMENTS

| 62-198039 | 2/1989 | Japan . |
| 42042 | 2/1989 | Japan . |
| 63-188417 | 2/1990 | Japan . |
| 64-118718 | 12/1990 | Japan . |
| 64-118719 | 12/1990 | Japan . |
| 64-149680 | 1/1991 | Japan . |
| 17844 | 1/1991 | Japan . |
| 64-171821 | 2/1991 | Japan . |
| 62338 | 3/1991 | Japan . |
| 64-197738 | 3/1991 | Japan . |
| 64-296533 | 7/1991 | Japan . |

*Primary Examiner*—Stevan A. Resan
*Attorney, Agent, or Firm*—Watson Cole Stevens Davis, PLLC

[57] ABSTRACT

A magneto-optical recording disc adapted for magneto-optical recording in the magnetic field modulation system by means of a magnetic head in continuous contact with the disc includes a recording layer on a substrate and a wear resistant resinous coating thereon. The coating is formed of a resin containing carbon particles having a mean particle size of 1 to 15 μm. The magnetic head is in sliding contact with the surface of the coating during operation. The coating is effective for reducing friction with the magnetic head and retains such reduced friction over a long time.

8 Claims, 2 Drawing Sheets

MAGNETO-OPTICAL DISC HAVING A PROTECTIVE LAYER OF CURED RADIATION CURABLE RESIN CONTAINING CARBON PARTICLES

This application is a FIle Wrapper continuation application of application Ser. No. 08/045,106, filed 12 Apr. 1993 now abandoned.

BACKGROUND OF THE INVENTION

This invention relates to a magneto-optical recording disc adapted for magneto-optical recording in the magnetic field modulation system.

Optical discs are of great interest as high capacity information bearing media. Among the optical discs, magneto-optical discs of the magnetic field modulation system are expected to find use in data files and other advanced applications. A magneto-optical disc is recorded in the magnetic field modulation system by directing a laser beam from an optical head to the recording layer of the disc in a DC manner for raising the temperature of the irradiated spot, and applying a modulated magnetic field across the recording layer from a magnetic head opposed to the optical head at the same time. Therefore, the magnetic field modulation system allows for overwrite recording.

Most of conventional magneto-optical disc drives depend on a contact start and stop (CSS) system using a flying magnetic head. The magnetic head is in contact with the disc surface at the start and end of disc rotation. Thus the disc on the magnetic head facing surface is provided with a protective coating for preventing the magnetic head from adsorption and crushing.

For the protective coating on magneto-optical discs of the CSS system, various resin compositions were proposed. For example, Japanese Patent Application Kokai (JP-A) No. 301040/1990 discloses a resin composition predominantly comprising a fluorinated polyurethane resin and JP-A 37844/1991 discloses a resin composition predominantly comprising a fluoro-resin soluble in organic solvents. It is also proposed to incorporate metal elements and lubricants in the resin composition, the metal elements having greater ionization tendency than the transition metal element of which the recording film is made. JP-A 40149/1990 discloses a UV-curable resin having a lubricant blended therein, JP-A 17844/1991 discloses a lubricating layer, and JP-A 62338/1991 discloses an overcoat layer over which fine particulates of silicone resin or nickel are dispersed to uniformly distribute irregularities of 0.1 to 0.5 μm high on the surface.

Magneto-optical discs capable of recording/reading operation at the same linear velocity as the compact disc (CD) are recently highlighted since they can share the drive unit with the CD simply by adding or modifying the optical system. The CD employs a linear velocity as low as 1.2 to 1.4 m/sec. at which the magnetic head cannot be float. Then the CSS system cannot be employed. One would attempt to use a stationary magnetic head which is held at a fixed distance from the disc surface. The stationary magnetic head, however, can collide with the disc due to axial runouts of the disc and vibration of the drive unit. Servo means must be provided in order to allow the head to follow axial runouts of the disc, resulting in a complex drive mechanism.

Under the circumstances, we reached the concept of a magnetic head in continuous contact with the disc surface and made research works on a magneto-optical disc capable of such operation. It was found that when the magnetic head was in sliding contact with the disc surface, the protective coatings previously proposed for the CSS system were unsatisfactory.

More particularly, the protective coating having a lubricant incorporated therein cannot retain lubricity for a sufficient time since the magnetic head is in continuous sliding contact with the protective coating surface. It is effective to increase the surface roughness of a protective coating by dispersing fine particulates therein. Although JP-A 62338/1991 discloses to disperse fine particulates of resin or magnetic material having a size of 0.2 to 1.2 μm to provide irregularities of 0.1 to 0.5 μm high, the roughness of this order on the protective coating is insufficient to reduce friction. It is then difficult to always maintain low friction between the magnetic head and the protective coating. Fine particulates of metals and ceramics have a sufficiently high hardness to cause damage to the magnetic head. It is to be noted that the average roughness referred to in JP-A 62338/1991 is probably in terms of Rz rather than Ra according to the inventors' knowledge though not specified in the disclosure.

SUMMARY OF THE INVENTION

An object of the present invention is to provide a magneto-optical recording disc adapted to be operated in continuous sliding contact with the magnetic head and having a surface coating layer which remains effective for reducing the friction with the magnetic head over the effective life of the disc.

The present invention is directed to a magneto-optical recording disc adapted for magneto-optical recording in the magnetic field modulation system in cooperation with a magnetic head, comprising a substrate, a recording layer on the substrate, and a wear resistant resinous coating on the recording layer. The magnetic head is in sliding contact with the surface of the coating during operation.

In a first form, the wear resistant resinous coating is formed from a resin containing carbon particles having a mean particle size of 1 to 15 μm.

In a second form, the wear resistant resinous coating is formed from a resin containing carbon particles and has a center line average roughness (Ra) of 0.1 to 1.0 μm. Preferably, the carbon particles have a mean particle size of 1 to 15 μm.

In one preferred embodiment, the carbon particles have such a particle size distribution that at least 99% of the entire carbon particles fall in a particle size range of from 0.2 times to 5 times the mean particle size. The resin is a radiation curable resin. The resin contains 5% to 50% by weight of the carbon particles. The coating has a thickness of 1 to 30 μm.

In the magneto-optical disc of the invention, the wear resistant resinous coating which defines the surface of the disc in sliding contact with the magnetic head contains carbon particles having a mean particle size of at least 1 μm. Inclusion of such relatively large size carbon particles provides the wear resistant resinous coating with sufficient roughness to always maintain low friction with the magnetic head in continuous contact therewith. Since such relatively large size carbon particles are unlikely to aggregate, they are evenly dispersed in the resin composition from which the wear resistant resinous coating is formed so that the wear resistant resinous coating may have a low coefficient of friction over the entire surface thereof. Carbon particles are softer than particles of ceramics and metals and do not cause damage to the magnetic head in continuous contact therewith. This, in turn, suggests that the advantages of the present invention are not available with JP-A 62338/1991.

It is to be noted that JP-A 157836/1991 discloses to add carbon as an antistatic agent to the uppermost layer on a disc along with an abrasive. This patent discloses nowhere the particle size of carbon, indicating that it does not attempt to improve sliding performance. JP-A 301040/1990 discloses to add carbon black or graphite to the uppermost layer on a disc for improving durability. This patent discloses nowhere the particle size of carbon black or graphite. In general, carbon black has a particle size of a submicron range which is smaller than the size of carbon particles used in the present invention. JP-A 42042/1989 discloses to add carbon as a coloring agent to the uppermost layer on a disc. This patent discloses nowhere the particle size of carbon. In addition, the magneto-optical discs to which these patents pertain are not designed for the operating mode in continuous contact with the magnetic head as contemplated in the present invention.

DETAILED DESCRIPTION OF THE INVENTION

Figure 1:
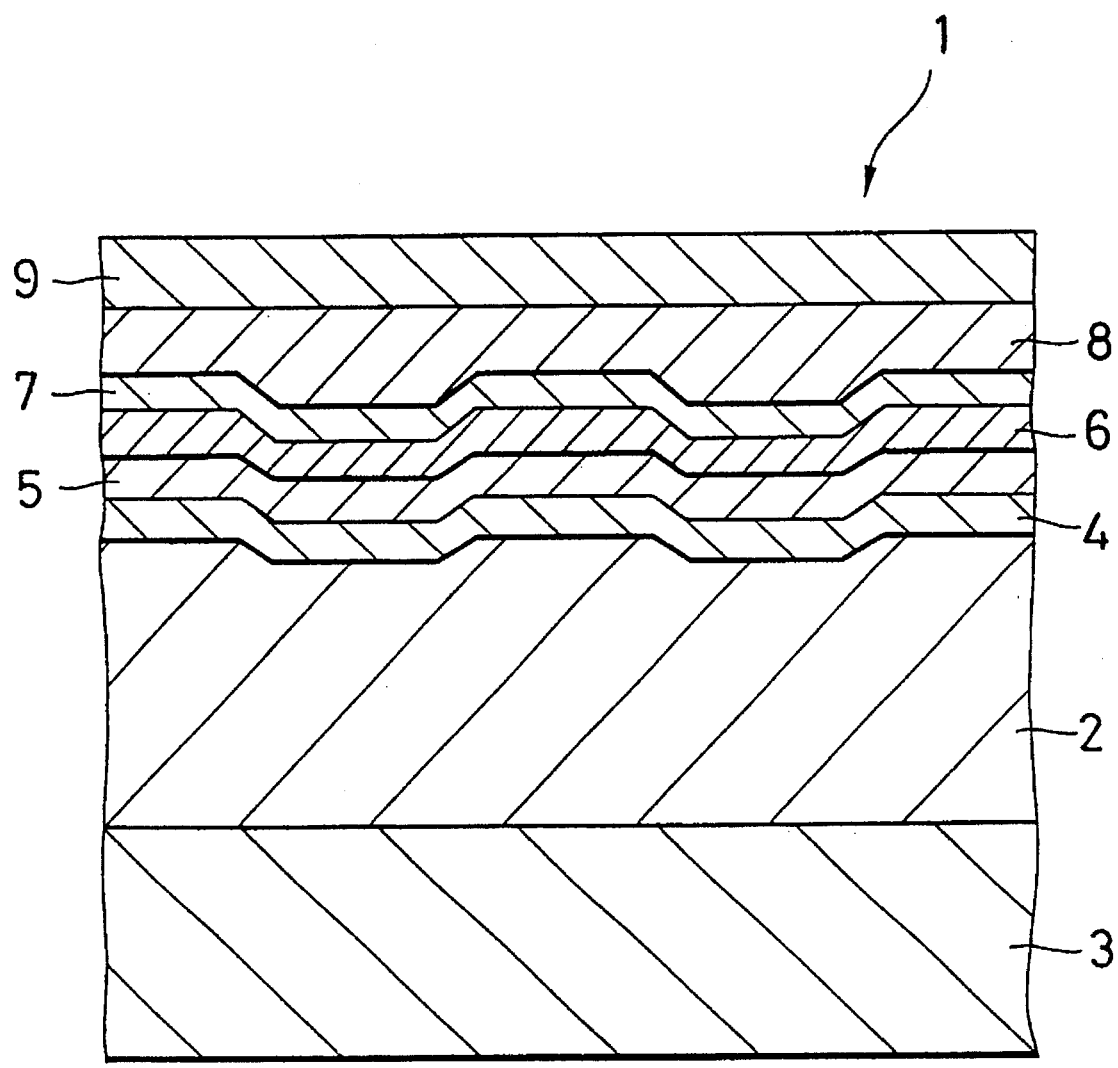
FIG. 1 is a fragmental cross-sectional view of a magneto-optical recording disc according to one embodiment of the present invention.
Figure 2:
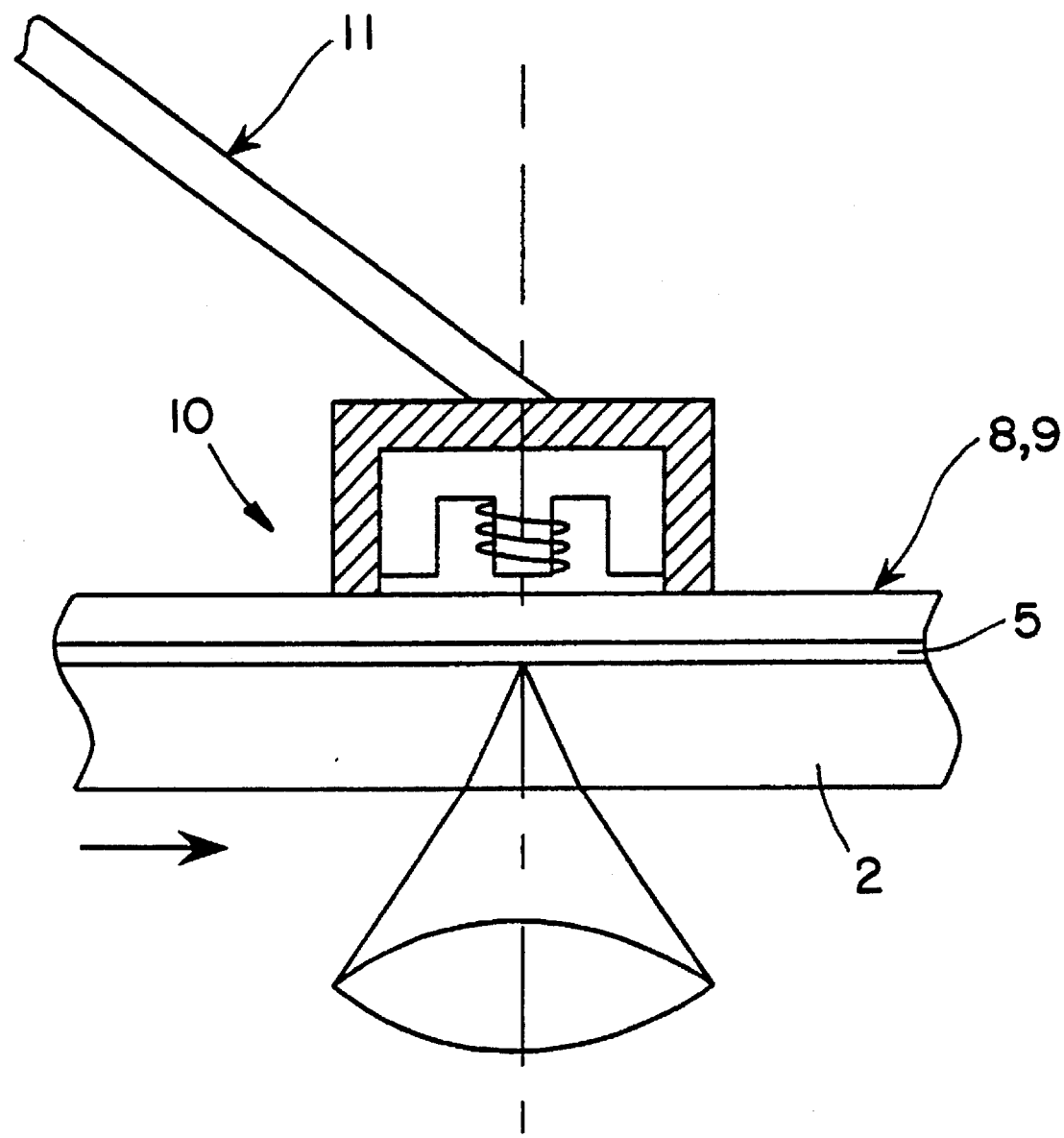
FIG. 2 is a cross-sectional view of a magnetic head of the contact type shown in contacting relationship with the surface of a magneto-optical disc having a composite surface for reducing the friction with the magnetic head in accordance with the invention.

The magneto-optical recording disc according to the present invention includes a recording layer on a substrate and a wear resistant resinous coating on the recording layer. More particularly, the disc preferably has the structure shown in FIG. 1. The magneto-optical disc generally designated at 1 is shown in FIG. 1 as comprising on one surface of a substrate 2, a first protective layer 4, a recording layer 5, a second protective layer 6, a reflective layer 7, a protective coating 8 and a wear resistant resinous coating 9 in the described order. The magnetic head 10 is in sliding contact with the exposed surface of the wear resistant resinous coating 9 during operation, as shown in FIG. 2. Since the magnetic head is generally supported by a suspension mechanism 11 such that it may follow axial runouts of the rotating disc, the magnetic head 10 does not fly away from the disc surface 8,9 during operation.

The wear resistant resinous coating 9 contains carbon particles. The shape of carbon particles is not particularly limited and any of spherical, flake, globular and fibrous shapes may be used, with spherical particles being preferred. The carbon particles have a mean particle size of 1 to 15 μm, preferably 2 to 10 μm. Carbon particles having a submicron size are not effective for reducing the friction of the coating upon sliding contact with the magnetic head. Carbon particles with a larger size beyond the range are not effective for reducing the friction. The mean particle size of carbon particles is measured by means of a scanning electron microscope (SEM). For carbon particles of non-spherical shape, the diameters of circles equivalent to the projected areas of such particles are determined, from which the mean particle size is calculated.

The carbon particles in the wear resistant resinous coating should preferably have such a particle size distribution that at least 99% of the entire carbon particles fall in a particle size range of from 0.2 times to 5 times the mean particle size, that is, a particle size of from 0.2 d to 5 d wherein d is the mean particle size. Better results are obtained with the use of carbon particles having such a particle size distribution.

Carbon particles are commercially available or may be prepared by firing resin particles for carbonization.

Preferably the wear resistant resinous coating 9 contains 5% to 50% by weight, especially 10% to 30% by weight of the carbon particles based on the weight of the coating. Contents below this range would provide a less friction reducing effect. With contents beyond this range, a dispersion of carbon particles in a resin would become uneven and too viscous to coat.

In general, carbon particles are uniformly dispersed in the wear resistant resinous coating in both parallel and perpendicular directions to the surface. If desired, carbon particles can be locally distributed in a surface layer. In the embodiment shown in FIG. 1, the wear resistant resinous coating 9 is formed on the protective coating 8 free of carbon particles although the protective coating 8 may be omitted.

In the second form, the wear resistant resinous coating has a center line average roughness (Ra) of 0.1 to 1.0 μm as measured over a length of 0.5 mm according to JIS B-0601. Coatings with Ra of less than 0.1 μm or more than 1.0 μm provide increased friction with the magnetic head in sliding contact therewith, resulting in undesirable loads on the magnetic head and the drive unit. This range of Ra is readily achieved by incorporating carbon particles having a mean particle size of the above-defined range in a resin.

The resin of which the wear resistant resinous coating 9 is made is preferably a radiation curable resin. More particularly, the coating is made of a material obtained by radiation curing a radiation curable compound or a polymerizable composition thereof. Illustrative are monomers, oligomers and polymers having contained or incorporated in their molecule groups capable of crosslinking or polymerizing upon exposure to radiation, for example, acrylic double bonds as given by acrylic and methacrylic acids and esters thereof having an unsaturated double bond sensitive to ionization energy and capable of radical polymerization, allyl double bonds as given by diallyl phthalate, and unsaturated bonds as given by maleic acid and maleic derivatives. They are preferably polyfunctional, especially trifunctional or more and used alone or in admixture of two or more.

The radiation curable monomers and oligomers used herein preferably have a molecular weight of less than 2,000 and 2,000 to 10,000, respectively. Examples include styrene, ethyl acrylate, ethylene glycol diacrylate, ethylene glycol dimethacrylate, diethylene glycol diacrylate, diethylene glycol methacrylate, 1,6-hexane glycol diacrylate, and 1,6-hexane glycol dimethacrylate while preferred examples include pentaerythritol tetraacrylate (or methacrylate), pentaerythritol acrylate (or methacrylate), trimethylolpropane triacrylate (or methacrylate), trimethylolpropane diacrylate (or methacrylate), acryl-modified urethane elastomers, and derivatives of these having a functional group such as COOH incorporated therein, phenol ethylene oxide adduct acrylate (or methacrylate), compounds in which an acryl or methacryl group or ε-caprolactone acryl group attached to a pentaerythritol fused ring as disclosed in Japanese Patent Application No. 72888/1987, and acryl group-containing monomers and oligomers such as special acrylates as disclosed in Japanese Patent Application No. 72888/1987.

Other useful radiation curable oligomers are acryl-modified ones of oligoester acrylate and urethane elastomers and derivatives of these having a functional group such as COOH incorporated therein.

In addition to or instead of the above-mentioned compound, there may be used radiation curable compounds obtained by modifying thermoplastic resin to be radiation sensitive. Exemplary radiation curable resins are thermoplastic resins containing or having incorporated in a molecule thereof a group capable of crosslinking or polymerizing upon exposure to radiation, for example, a acrylic double bond as given by acrylic acid, methacrylic acid and esters thereof having an unsaturated double bond capable of radical polymerization, an allyl double bond as given by diallyl phthalate, and an unsaturated bond as given by maleic acid and maleic derivatives. Examples of the thermoplastic resins which can be modified to be radiation curable include vinyl chloride copolymers, saturated polyester resins, polyvinyl alcohol resins, epoxy resins, phenoxy resins, and cellulosic derivatives. Other resins which can be modified to be radiation curable include polyfunctional polyester resins, polyether ester resins, polyvinyl pyrrolidone resin and derivatives (PVP-olefin copolymers), polyamide resins, polyimide resins, phenolic resins, spiro-acetal resins, and acrylic resins containing at least an acrylate and methacrylate having a hydroxyl group as a polymerizable component.

A polymerizable coating composition is cured with radiation, typically ultraviolet radiation and a photo-polymerization initiator or sensitizer is preferably contained in the composition. The photo-polymerization initiator or sensitizer used herein is not critical and may be selected from conventional ones such as acetophenones, benzoins, benzophenones, and thioxanthoins. A mixture of initiators and/or sensitizers is also useful. The composition may contain about 0.5% to 5% by weight of the initiator or sensitizer. The polymerizable composition may be synthesized by a conventional method or prepared by mixing commercially available compounds.

Another composition containing a radiation curable compound from which the wear resistant resinous coating can be formed is one containing an epoxy resin and a cationic photo-polymerization catalyst. Epoxy resins are preferably alicyclic epoxy resins, especially those having two or more epoxy groups in a molecule. Exemplary alicyclic epoxy resins are 3,4-epoxycyclohexylmethyl-3,4-epoxycyclohexane carboxylate, bis(3,4-epoxycyclohexylmethyl)adipate, bis(3,4-epoxycyclohexyl)adipate, 2-(3,4-epoxycyclohexyl-5,5-spiro-3,4-epoxy)cyclohexane-meta-dioxane, bis(2,3-epoxycyclopentyl) ether, vinylcyclohexene dioxide alone or in admixture. The alicyclic epoxy resins may have any desired epoxy equivalent although an epoxy equivalent of 60 to 300, especially 100 to 200 is preferred for satisfactory curability.

The cationic photo-polymerization catalyst may be selected from well-known ones. Examples include complexes of metal fluoroborate and boron trifluoride, bis(perfluoroalkylsulfonyl)methane metal salts, aryl diazonium compounds, aromatic onium salts of Group 6A elements, aromatic onium salts of Group 5A elements, dicarbonyl chelates of Group 3A to 5A elements, thiopyrilium salts, Group 6A elements having $MF_6$ anions wherein M is P, As or Sb, triaryl sulfonium complex salts, aromatic iodonium-complex salts, and aromatic sulfonium complex salts. Preferred are polyaryl sulfonium complex salts, aromatic sulfonium or iodonium salts of halo-containing complex ions, and aromatic onium salts of Group 3A, 5A or 6A elements.

Also useful are cationic photo-polymerization catalysts containing an organometallic compound and a photo-decomposable organic silicon compound. These cationic photo-polymerization catalysts are non-strong acid systems and thus avoid any adverse effect to the corrosion-susceptible recording layer of the magneto-optical recording disc. The organometallic compounds are preferably complex compounds in which alkoxy, phenoxy, β-diketonato and similar groups are coordinated to a metal atom such as Ti, V, Cr, Mn, Fe, Co, Ni, Cu, Zn, Al, and Zr. Especially preferred are organic aluminum compounds such as trismethoxy aluminum, trispropionato aluminum, tristrifluoroacetyl aluminum, and trisethylacetoacetonato aluminum. The photo-decomposable organic silicon compounds are to form silanols upon exposure to radiation such as ultraviolet radiation. Silicon compounds having a peroxysilano, o-nitrobenzyl and α-ketosilyl group are preferred. Preferably the composition contains 0.05 to 0.7 parts, especially 0.1 to 0.5 parts by weight of the cationic photo-polymerization catalyst per 100 parts by weight of the epoxy resin.

Preferred among the aforementioned compositions is a composition containing a radiation curable compound having an acryl group and a photo-polymerization initiator or sensitizer, which is applied to form a coating and then cured with radiation, especially UV radiation.

The wear resistant resinous coating is preferably 1 to 30 μm, especially 2 to 20 μm thick. With a thickness of less than 1 μm, it would be difficult to form a uniform film and a durability problem would arise. Too thick coatings tend to crack due to shrinkage upon curing or cause warpage of the disc.

For example, the wear resistant resinous coating 9 is prepared by first adding a predetermined amount of carbon particles to a resin, preferably a radiation curable resin composition as mentioned above, and applying the composition to form a coating on the protective coating 8. The coating method is not critical and may be selected from well-known ones such as spin coating, screen printing, gravure coating, spray coating and dipping. Coating conditions may be properly determined by taking into account the viscosity of polymerizable composition, the desired buildup of coating and the like. Then the coating is exposed to UV radiation for curing. If desired, the coating is heated prior to UV exposure. Instead of UV, electron radiation or the like may be used. Typically, the coating is exposed to UV radiation at an intensity of about 50 $mW/cm^2$ or more and a dose of about 500 to 2,000 $mJ/cm^2$. The UV source may be a conventional one such as a mercury lamp. Upon UV exposure, the compounds undergo radical polymerization.

Now the remaining components of the disc are described.

The substrate 2 is generally formed of glass or transparent resins such as polycarbonate, acrylic resins, amorphous polyolefins, and styrene resins. Such a choice is made because the magneto-optical disc of the invention is recorded and read by using an optical head positioned on the rear surface side of the substrate 2 (the lower side in FIG. 1, as shown in FIG. 2) and directing a laser beam to the recording layer 5 through the substrate 2. The surface of the substrate 2 on which the recording layer 5 is formed is generally provided with grooves and pits for tracking and addressing purposes.

The first and second protective layers 4 and 6 are effective for improving C/N and preventing corrosion of the recording layer and generally about 30 to 300 nm thick. It is desired to provide at least one of these protective layers, most desirably both. The protective layers are formed of a dielectric material such as oxides, carbides, nitrides, sulfides and mixtures thereof by any desired gas phase deposition method such as sputtering, evaporation and ion plating.

The recording layer 5 disposed between the first and second dielectric layers 4 and 6 is one in which information can be magnetically recorded using a modulated magnetic field and the recorded information be read through magneto-optical conversion. The recording layer 5 may be formed of any desired material which is capable of such magneto-optical recording. Preferably, it is prepared by depositing an alloy containing a rare earth metal element, especially a rare earth metal-transition metal alloy by sputtering, evaporation or ion plating, preferably by sputtering, to form an amorphous film. Some preferred examples of the recording layer composition are TbFeCo, DyTbFeCo, NdDyFeCo, and NdGdFeCo. The recording layer is generally about 10 to 1,000 nm thick.

The reflective layer 7 is optionally disposed on the second dielectric layer 6 and formed of any of relatively high reflectivity metal materials which include Au, Ag, Pt, Al, Ti, Cr, Ni and Co and alloys or compounds thereof. The reflective layer may be formed in a similar manner to the recording layer 5. The reflective layer is generally about 30 to 200 nm thick.

The protective coating 8 is optional and provided for protecting the underlying sputtered layers from the first protective layer 4 to the reflective layer 7. The composition of the protective coating 8 is the same as the wear resistant resinous coating 9 except that it is free of carbon particles.

On the rear surface of the substrate 2 is formed a transparent hard coating 3 as shown in FIG. 1, if desired. The composition and thickness of the hard coating are the same as the protective coating 8. Preferably the hard coating 3 is rendered antistatic by adding a surfactant or the like. The hard coating may be disposed not only on the rear surface of the substrate, but also on the inner and outer peripheral edges of the disc.

EXAMPLE

Examples of the present invention are given below by way of illustration and not by way of limitation.

Magneto-optical disc samples, Nos. 1 to 4, were prepared as reported in Table 1.

First, a disc-shaped polycarbonate substrate having an outer diameter of 64 mm, an inner diameter of 11 mm and a recording area thickness of 1.2 mm was coated on one major surface and outer and inner peripheral edges with a hard coating composition which was cured with UV radiation to form a hard coating of about 5 μm thick.

Next a first protective layer of SiNx was deposited on the opposite major surface of the substrate by RF magnetron sputtering to a thickness of 80 nm. A recording layer of the composition: $Tb_{23}Fe_{72}Co_5$ was then deposited on the first protective layer by sputtering to a thickness of 20 nm. A second protective layer of the same composition as the first one was deposited on the recording layer by RF magnetron sputtering to a thickness of 20 nm. An aluminum alloy reflective layer of 80 nm, a protective coating, and a wear resistant resinous coating were then provided on the second protective layer.

The protective coating was formed by spin coating the following polymerizable composition and exposing the coating to UV radiation in a dose of 1,000 mJ/cm² for curing. At the end of curing, the protective coating had an average thickness of about 5 μm.

| Polymerizable composition | Parts by weight |
| --- | --- |
| Oligoester acrylate (Mw 5,000) | 50 |
| Trimethylolpropane triacrylate | 50 |
| Acetophenone photopolymerization initiator | 3 |

The wear resistant resinous coating was formed by adding carbon particles to the same polymerizable composition as above, spin coating the composition to the protective coating, and curing the coating in the same manner as above. The mean particle size (d) of carbon particles is reported in Table 1 together with the content of carbon particles based on the total weight of the wear resistant resinous coating. The carbon particles has a particle size distribution as previously mentioned. At the end of curing, the coating had an average thickness of about 5 μm.

A comparative sample (No. 5) was prepared by the same procedure as above except that phenolic resin particles having a mean particle size of 7 μm were used instead of the carbon particles.

Another comparative sample (No. 6) was prepared by the same procedure as above except that the wear resistant resinous coating was omitted.

The samples were measured for Ra by means of a Talystep meter, with the results shown in Table 1.

The samples were evaluated for a coefficient of dynamic friction and contact durability by the following method.
Coefficient of dynamic friction Using a 3.5" magnetic disc drive (manufactured by Plus K.K.), the disc was rotated at 1 rpm. The stress applied to the head under a load of 15 grams was measured, from which a coefficient of dynamic friction μ was calculated.
Contact durability test Using a 3.5" magnetic disc drive (manufactured by Plus K.K.), the disc was rotated in sliding contact with the head at a linear velocity of 1.4 m/sec. After $2\times10^6$ passes under 20° C./RH 50%, a coefficient of dynamic friction μl was determined as a measure of frictional durability.

TABLE 1

| | Carbon particles | | Resin particles | | | | | |
| --- | --- | --- | --- | --- | --- | --- | --- | --- |
| No. | d (μm) | content (wt %) | d (μm) | content (wt %) | Ra (μm) | μ | μl | Remarks |
| 1 | 5 | 15 | — | — | 0.4 | 0.13 | 0.11 | Invention |
| 2 | 5 | 30 | — | — | 0.6 | 0.13 | 0.13 | Invention |
| 3 | 0.3* | 20 | — | — | <0.05* | UM | UM | Comparison |
| 4 | 20* | 20 | — | — | >1.5* | 0.25 | 0.30 | Comparison |
| 5 | — | — | 7 | 20 | 1.2* | 0.35 | 0.50 | Comparison |
| 6 | — | — | — | — | <0.05* | UM | UM | Comparison |

*outside the scope of the invention

The effectiveness of the present invention is evident from Table 1. Sample Nos. 1 and 2 in which carbon particles have a mean particle size within the specific range and the wear resistant resinous coating has a Ra within the specific range had a low coefficient of dynamic friction μ and showed no increase in coefficient of dynamic friction after contact operation. In contrast, sample No. 4 in which the wear resistant resinous coating has a Ra beyond the specific range and sample No. 5 having a wear resistant resinous coating containing resin particles had a high coefficient of dynamic friction B and showed a substantial increase in coefficient of dynamic friction after contact operation. In sample No. 3 in which the mean particle size and Ra are below the specific ranges and sample No. 6 having only the protective coating, adsorption of the magnetic head to the disc surface occurred during the coefficient of dynamic friction measurement.

Although some preferred embodiments have been described, many modifications and variations may be made thereto in the light of the above teachings. It is therefore to be understood that within the scope of the appended claims, the invention may be practiced otherwise than as specifically described.

We claim:

1. A magnetic field modulation system for magneto-optical recording, comprising:

a magneto-optical recording disc, comprising:

a substrate, a recording layer on the substrate, a wear resistant cured resinous coating formed on the recording layer from a resin containing 5% to 30% by weight of carbon particles having a mean particle size of 2 to 10 μm, said coating having a center line average roughness (Ra) of 0.1 to 1.0 μm, said resin is a radiation curable resin, said modulation system further comprising;

a magnetic head in continuous sliding contact with said wear resistant coating during operation of the magnetic field modulation system; and wherein:

said carbon particles reducing the friction between said magnetic head and said wear resistant coating.

2. The magnetic field modulation system for magneto-optical recording of claim 1, wherein said carbon particles have such a particle size distribution that at least 90% of the entire carbon particles fall in a particle size range of from 0.2 times to 5 times the mean particle size.

3. The magnetic field modulation system for magneto-optical recording of claim 1, wherein said coating contains 10% to 30% by weight of the carbon particles.

4. The magnetic field modulation system for magneto-optical recording of claim 1, wherein said coating has a thickness of 1 to 30 μm.

5. The magnetic field modulation system of claim 1, wherein said resin is a radiation curable resin selected from the group consisting of monomers, oligomers, and polymers having one or more acrylic or methacrylic double bonds.

6. The magnetic field modulation system of claim 5, wherein said carbon particles have such a particle size distribution that at least 99% of the entire carbon particles fall in a particle size range of from 0.2 times to 5 times the mean particle size.

7. The magnetic field modulation system of claim 5, wherein said coating contains 10% to 20% by weight of the carbon particles.

8. The magnetic field modulation system of claim 5, wherein said coating has a thickness of 1 to 30 μm.

* * * * *